US007420603B2

(12) United States Patent
Mishina et al.

(10) Patent No.: US 7,420,603 B2
(45) Date of Patent: Sep. 2, 2008

(54) SOLID-STATE IMAGE PICKUP DEVICE AND MODULE TYPE SOLID-STATE IMAGE PICKUP DEVICE (75) Inventors: Koji Mishina, Kanagawa (JP); Ryoji Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 641 days.

(21) Appl. No.: 11/042,386

(22) Filed: Jan. 25, 2005

(65) Prior Publication Data
US 2005/0168604 A1 Aug. 4, 2005

(30) Foreign Application Priority Data
Jan. 30, 2004 (JP) ............... 2004-024196

(51) Int. Cl.
*H04N 5/335* (2006.01)
*H01L 31/062* (2006.01)
*H01L 27/00* (2006.01)
(52) U.S. Cl. .................. 348/294; 348/308; 257/291; 250/208.1
(58) Field of Classification Search ........... 348/294, 348/308, 311; 257/292, 221; 250/208.1
See application file for complete search history.

(56) References Cited
U.S. PATENT DOCUMENTS
4,851,890 A * 7/1989 Miyatake .............. 257/230

5,122,850 A * 6/1992 Burkey .................. 348/314
5,476,808 A * 12/1995 Kusaka et al. ............ 438/75
6,351,001 B1 * 2/2002 Stevens et al. ........... 257/223

FOREIGN PATENT DOCUMENTS
| JP | 57-005361 | 1/1982 |
|----|-----------|--------|
| JP | 62-290159 | 12/1987 |
| JP | 62-290169 | 12/1987 |
| JP | 2000-164849 | 6/2000 |
| JP | 2002-100754 | 4/2002 |

* cited by examiner

*Primary Examiner*—Nhan T Tran
(74) *Attorney, Agent, or Firm*—Robert J. Depke; Rockey, Depke & Lyons, LLC (57) ABSTRACT

A solid-state image pickup device comprises a plurality of pixels arrayed in an XY matrix fashion, each pixel including a photoelectric-converting portion 1 for photoelectrically converting incident light into signal electric charges and accumulating therein the thus photoelectrically-converted signal electric charges, an accumulation region 3 for converting the thus accumulated signal electric charges into a voltage and a transfer gate 2 for transferring the signal electric charges accumulated in this photoelectric-converting portion 1 to the accumulation region 3, wherein an amount of saturation electric charges is increased by forming a difference in potential level under the transfer gate 2.

14 Claims, 8 Drawing Sheets

When Reading

When Pixels are Accumulated

After Reading

Potential Distribution

When Pixels are Accumulated

FIG. 2C (RELATED ART)

Potential Distribution

When Reading

FIG. 2D (RELATED ART)

Potential Distribution

After Reading

Potential Distribution

When Pixels are Accumulated

FIG. 3C
(RELATED ART)

Potential Distribution

When Reading

FIG. 3D
(RELATED ART)

Potential Distribution

After Reading

When Pixels are Accumulated

FIG. 7C

When Reading

FIG. 7D

After Reading

SOLID-STATE IMAGE PICKUP DEVICE AND MODULE TYPE SOLID-STATE IMAGE PICKUP DEVICE

BACKGROUND OF THE INVENTION

1. Field of the Invention

The present invention relates to a solid-state image pickup device suitable for increasing the number of pixels and which is suitable for being miniaturized and a module type solid-state image pickup device.

2. Description of the Related Art

It is customary that a solid-state image pickup device includes a plurality of pixels, each pixel including a photoelectric-converting portion (photodiode PD, sensor portion) for photoelectrically converting incident light into signal electric charges and accumulating the thus photoelectrically-converted signal electric charges, an accumulation region (floating diffusion region FD) for converting the thus accumulated signal electric charges into a voltage and a transfer gate for transferring the signal electric charges accumulated in this photoelectric-converting portion to the accumulation region (floating diffusion region FD), arrayed in an XY matrix fashion (that is, in a two-dimensional fashion).

As the number of pixels in this solid-state image pickup device is increased more and this solid-state image pickup device is miniaturized more, the size of the unit cell is reduced more. Concurrently therewith, a ratio with which an area of this pixel is occupied by a transistor is increased and the area of the photodiode serving as the photoelectric-converting portion is decreased, thereby resulting in an amount of saturation electric charges being decreased. Since image quality is lowered as the amount of saturation electric charges of the photodiode serving as the photoelectric-converting portion is decreased, the decrease of the amount of saturation electric charges becomes a serious problem in this solid-state image pickup device.

Figure 1:
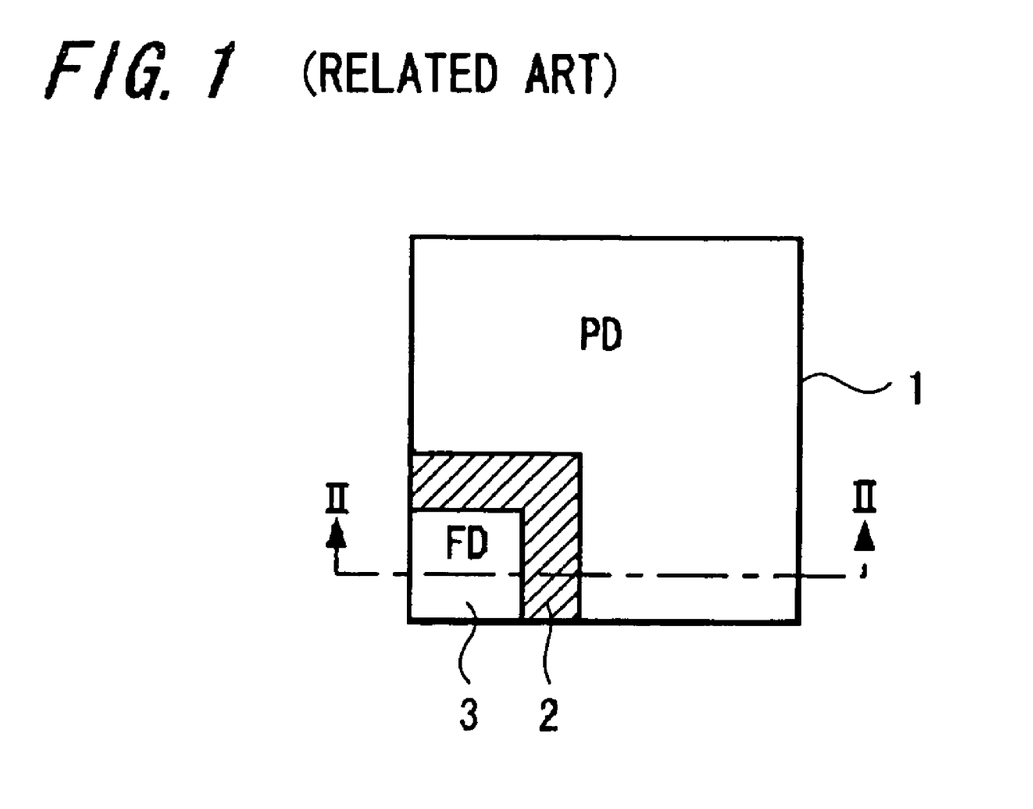
FIG. 1 is a plan view showing a main portion of an example of a solid-state image pickup device according to the related art.

FIG. 1 of the accompanying drawings is a schematic plan view showing an example of an arrangement of one pixel of a solid-state image pickup device according to the related art. In FIG. 1, reference numeral 1 denotes a photodiode (PD) comprising a photoelectric-converting portion, reference numeral 2 denotes a transfer gate and reference numeral 3 denotes a floating diffusion (FD) region.

Figure 2A:
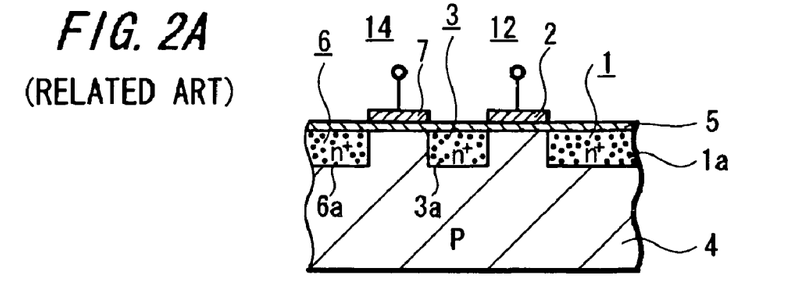
FIG. 2A is a cross-sectional view taken along the line II-II in FIG. 1 and shows a main portion of an example of a solid-state image pickup device according to the related art.

FIG. 2A is a cross-sectional view taken along the line II-II in FIG. 1. In FIG. 2A, reference numeral 4 denotes a p-type semiconductor substrate. As shown in FIG. 2A, an n-type region 1a is formed on this p-type semiconductor substrate 4 to form the photodiode (PD) 1.

Also, an n$^+$ type region 3a is formed on this p-type semiconductor substrate 4 to form the floating diffusion (FD) region 3 and a transfer gate 2 is formed on the p-type semiconductor substrate 4 between the n-type region 1a of the photodiode 1 and the n$^+$ type region 3a of the floating diffusion (FD) region 3 through an insulating layer 5 formed of an SiO$_2$ film.

Also, in FIG. 2A, reference numeral 6 denotes a reset drain formed of an n$^+$ type region 6a. A reset gate 7 is formed on the p-type semiconductor substrate 4 between the n$^+$ type region 3a of the floating diffusion (FD) region 3 and the n$^+$ type region 6a of the reset drain 6 through the insulating layer 5.

In this case, the n-type region 1a, the transfer gate 2 and the n$^+$ type region 3a constitute a read MOS (metal-oxide semiconductor) transistor 12 for reading pixels to the floating diffusion (FD) region 3. The n$^+$ type region 3a, the reset gate 7 and the n$^+$ type region 6 constitute a reset MOS transistor 14 for resetting signal electric charges of the floating diffusion (FD) region 3.

Figure 2B:
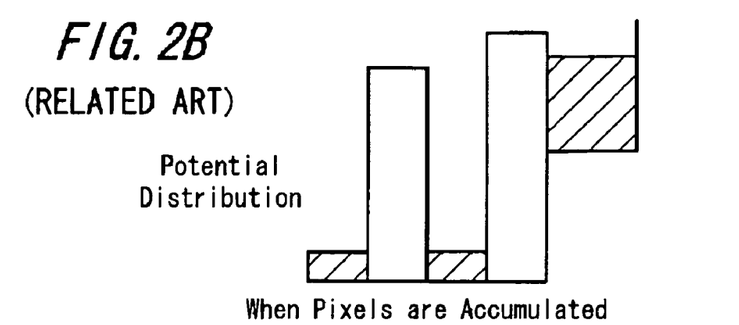
FIGS. 2B to 2D are respectively diagrams showing potential distributions of the solid-state image pickup device shown in FIG. 2A.
Figure 2C:
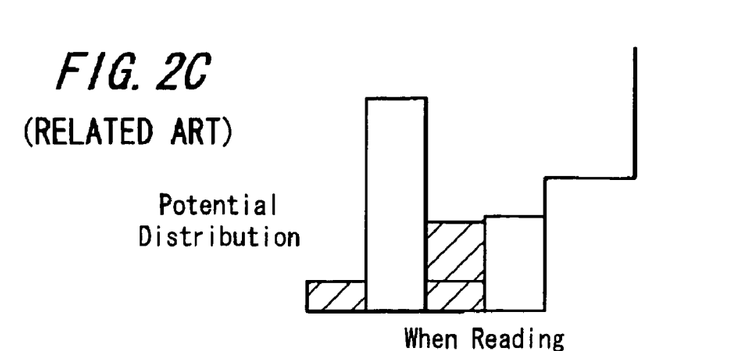
Figure 2D:
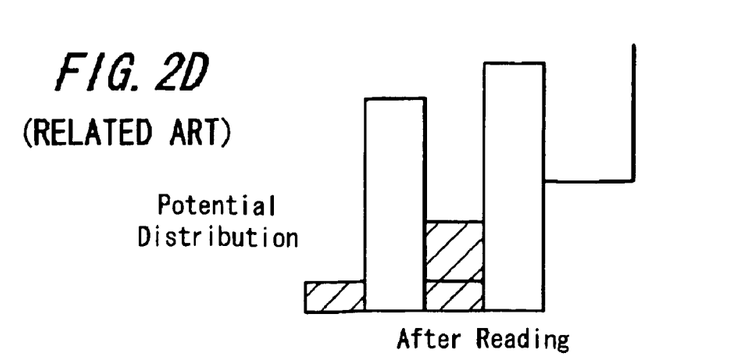

FIG. 2B shows a potential distribution obtained when pixels are accumulated in the solid-state image pickup device shown in FIG. 2A. FIG. 2C shows a potential distribution obtained when a read signal is supplied to the transfer gate. FIG. 2D shows a potential distribution obtained after the read signal was read out from the transfer gate 2.

Figure 3A:
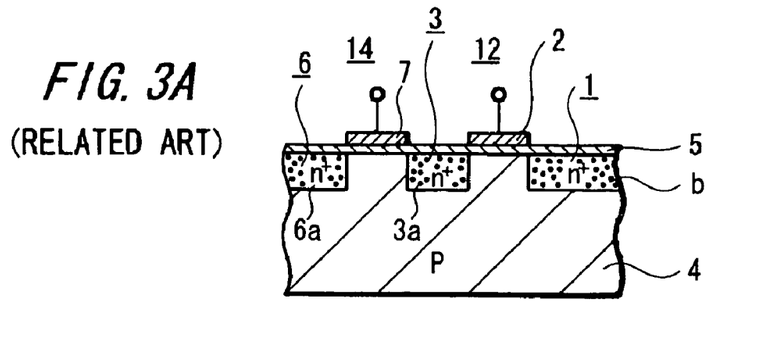
FIG. 3A is a cross-sectional view showing a main portion of an example of a solid-state image pickup device according to the related art.
Figure 3B:
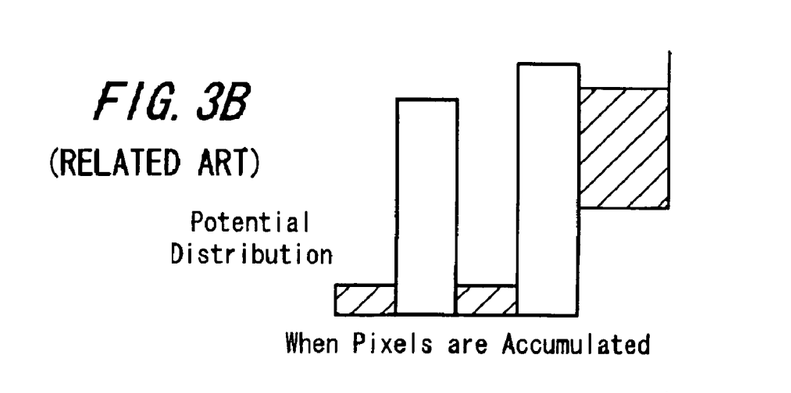
FIGS. 3B to 3D are respectively diagrams showing potential distributions of the solid-state image pickup device shown in FIG. 2A.

There has hitherto been proposed a method of increasing the amount of saturation electric charges of the photodiode (PD) 1. As shown in FIG. 3A, the n-type region 1a is changed to an n$^+$ type region 1b by increasing the dose of ions of n-type impurities implanted into this photodiode (PD) 1, whereby the potential depth of the photodiode (PD) 1 is increased as shown in FIG. 3B. Alternatively, as shown in the cited patent reference 1, the amount of saturation electric charges is increased by flattening the potential shape of the photodiode. [Cited patent reference 1]: Official gazette of Japanese laid-open patent application No. 2000-164849.

Figure 3C:
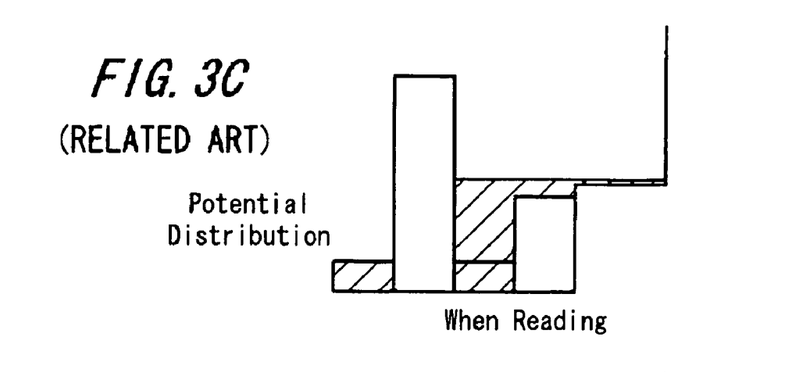
Figure 3D:
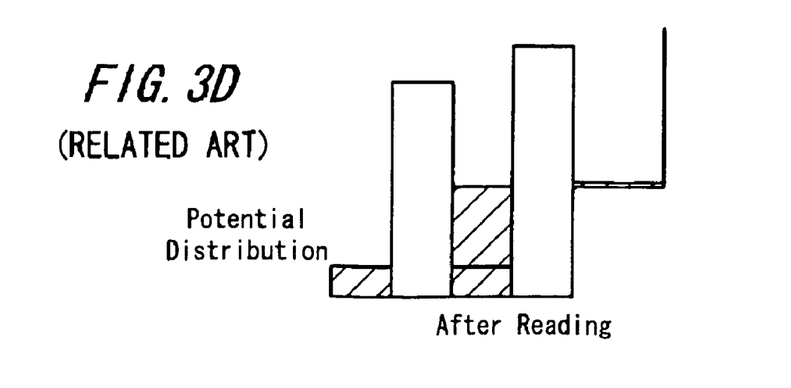

However, when the number of pixels of this solid-state image pickup device is increased and this solid-state image pickup device is miniaturized, the unit size of one pixel is reduced and there is a limit to increasing the amount of saturation electric charges of this photodiode (PD) 1. If the area of the floating diffusion (FD) region 3 is not increased by increasing the amount of saturation electric charges more than this limit, then when the read signal is supplied to the transfer gate 2, as shown in FIGS. 3C and 3D, all electric charges accumulated in the photodiode (PD) 1 cannot be transferred to the floating diffusion (FD) region 3 and the electric charges are left in the photodiode (PD) 1. There is then a disadvantage that a residual image is generated.

SUMMARY OF THE INVENTION

In view of the aforesaid aspect, it is an object of the present invention to provide a solid-state image pickup device in which an amount of saturation electric charges of a photodiode can be increased without causing a residual image.

It is other object of the present invention to provide a module type solid-state image pickup device in which an amount of saturation electric charges of a photodiode can be increased without causing a residual image.

It is a further object of the present invention to provide a module type solid-state image pickup device which is formed as a set of a plurality of chips.

According to an aspect of the present invention, there is provided a solid-state image pickup device which is comprised of a plurality of pixels, each of the pixel composed of a photoelectric-converting portion for photoelectrically-converting incident light into signal electric charges and accumulating the thus photoelectrically-converted signal electric charges, an accumulation region for converting the accumulated signal electric charges into a voltage and a transfer gate for transferring the signal electric charges accumulated in the photoelectric-converting portion to the accumulation region, wherein an amount of saturation electric charges is increased by a difference in potential level formed under the transfer gate.

In the solid-state image pickup device according to the present invention, the photoelectric-converting portion and the accumulation region are formed of first conductivity type semiconductor regions and a part of the accumulation region side under the transfer gate is doped by ions of first conductivity type impurities.

In the solid-state image pickup device according to the present invention, the photoelectric-converting portion and the accumulation region are formed of first conductivity type semiconductor regions and a part of the photoelectric-converting portion side under the transfer gate is doped by ions of second conductivity type impurities.

In accordance with another aspect of the present invention, there is provided a module type solid-state image pickup device which is comprised of an image pickup region composed of an array of a plurality of pixels, each pixel including a photoelectric-converting portion, a read gate portion for reading out electric charges generated by the photoelectric-converting portion and an accumulation portion for accumulating therein electric charges read out through the read gate portion and an optical system for introducing incident light into the image pickup region, wherein the read gate portion includes a first impurity region located on the side of the accumulation portion and a second impurity region having an electric potential lower than that of the first impurity region and which is adjacent to the first impurity region.

Further, in the module type solid-state image pickup device according to the present invention, the first and second impurity regions are formed under one gate electrode.

According to the present invention, since the difference in potential level is formed under the transfer gate, the capacity of the accumulation region can be increased so that the amount of saturation electric charges of the photodiode (photoelectric-converting portion) can be increased without causing a residual image.

DESCRIPTION OF THE PREFERRED EMBODIMENTS

A solid-state image pickup device and a module type solid-state image pickup device according to embodiments of the present invention will be described below with reference to the drawings.

Figure 4:
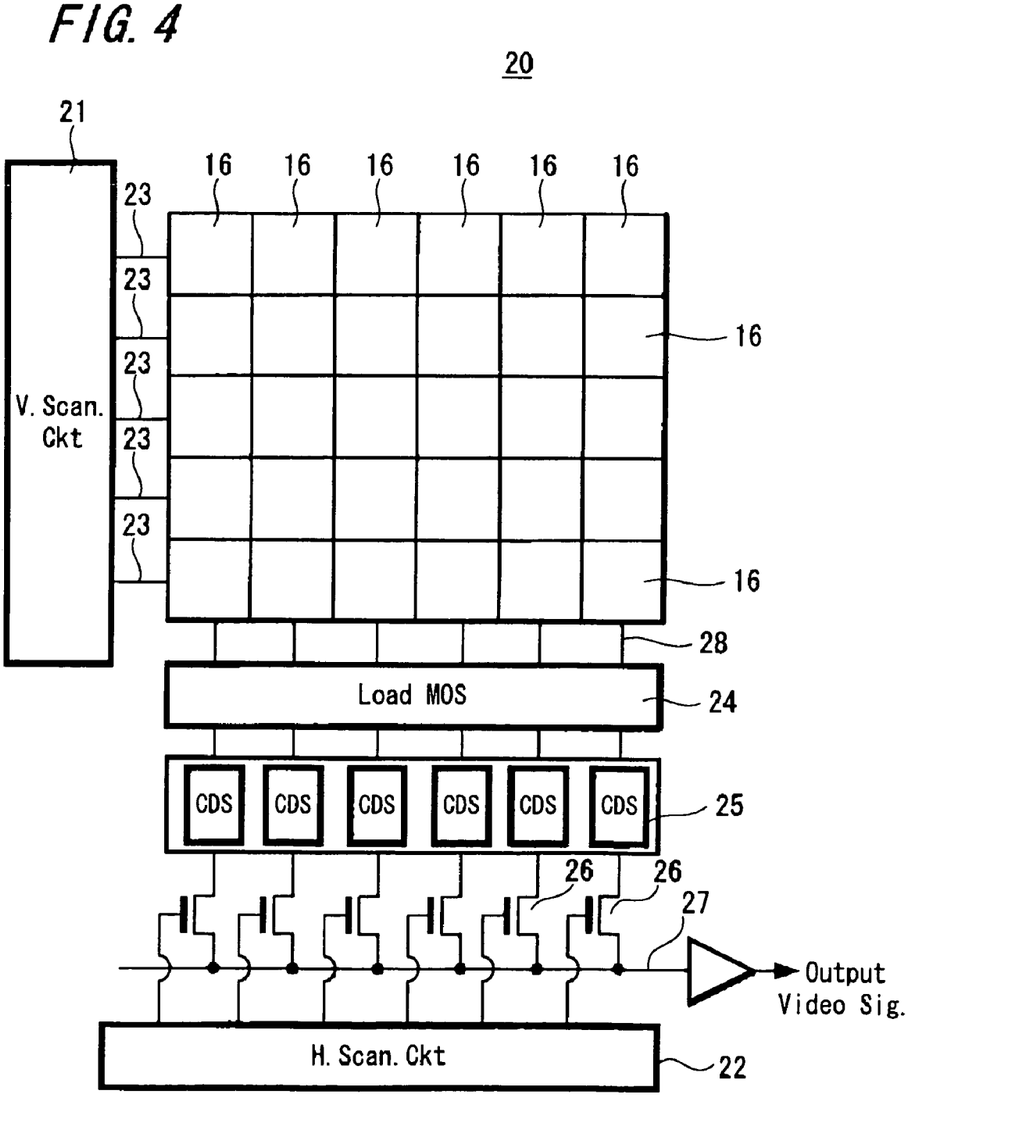
FIG. 4 is a schematic diagram showing an arrangement of a solid-state image pickup device according to an embodiment of the present invention.
Figure 5:
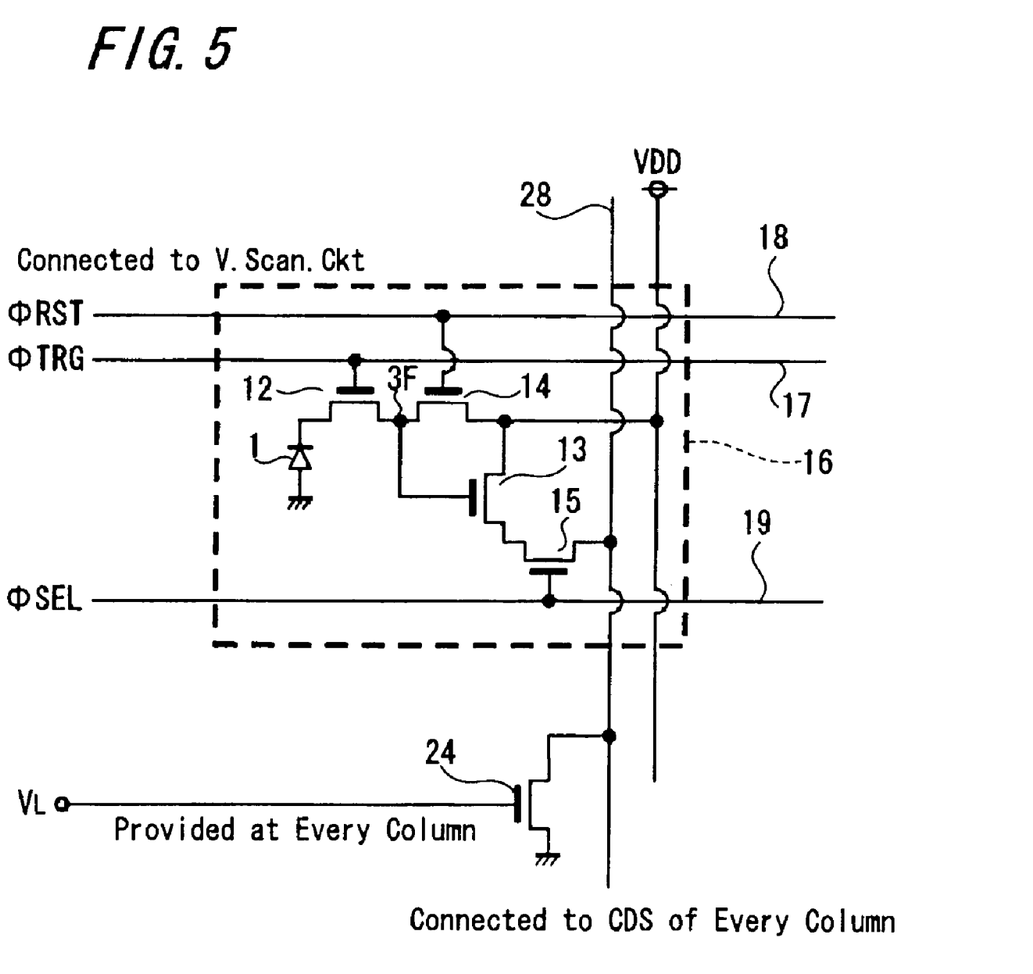
FIG. 5 is a schematic diagram showing an arrangement of an example of a unit pixel of the solid-state image pickup device shown in FIG. 4.

FIG. 4 is a schematic diagram showing an arrangement of a solid-state image pickup device according to an embodiment of the present invention. FIG. 5 is a schematic diagram showing an arrangement of an example of a unit pixel comprising the image pickup region of the solid-state image pickup device shown in FIG. 4.

As shown in FIGS. 4 and 5, a solid-state image pickup device according to the present invention includes an image pickup region 20 composed of a plurality of unit pixels 16 arrayed in an XY matrix fashion (that is, two-dimensional fashion), a vertical scanning circuit 21 and a horizontal scanning circuit 22. A plurality of unit pixels 16 provided at every horizontal line are commonly connected to scanning lines (that is, a reset line 18, a read line 17, a selection line 23). Also, a plurality of unit pixels 16 provided at every vertical line are respectively connected to a horizontal signal line 27 through a load MOS (metal-oxide semiconductor) transistor 24, CDS (correlation double sampling) circuits 25 and horizontal selection transistors (MOS) transistors 26. The horizontal scanning circuit 22 sequentially energizes the horizontal selection transistors 26 to generate an output video signal.

As shown in FIG. 5, this unit pixel 16 is composed of a photodiode 1 serving as a photoelectric-converting portion, a read MOS transistor 12 for reading a pixel signal to a floating diffusion (FD) region 3 (gate of the read MOS transistor 12 is referred to as a "transfer gate 2"), an amplifying MOS transistor 13 serving as an amplifying device, a reset MOS transistor 14 for resetting signal electric charges of the floating diffusion (FD) region 3 and a vertical selection MOS transistor 15 serving as a selection device. The unit pixels 16 are arrayed in an XY matrix fashion, that is, in a two-dimensional fashion.

As shown in FIG. 5, in this unit pixel 16, the gate (transfer gate 2) of the read MOS transistor 12 is connected to the read line 17, the gate (reset gate 7) of the reset MOS transistor 14 is connected to the reset line 18, the gate of the vertical selection MOS transistor 15 is connected to the selection line 19 and the source of the vertical selection MOS transistor 15 is connected to the vertical signal line 28, respectively.

Operations of this solid-state image pickup device will be described next. First, the pixel 16 of the line (horizontal line) to which a selection pulse φ SEL is applied through the selection line 19 is selected by the vertical scanning circuit 21. After that, the reset MOS transistor 14 is energized by a reset pulse φ RST and thereby a potential of the floating diffusion (FD) region 3 of each pixel 16 of the selected line is reset. After the potential of the floating diffusion (FD) region 3 was reset, the reset MOS transistor 14 is de-energized. At that time, the reset level of each pixel 16 of the selected line is outputted to the vertical signal line 28 through a source-follower circuit formed of the amplifying MOS transistor 13 and the load MOS transistor 24. Next, a read pulse φ TRG is applied to the gate of the read MOS transistor 12 to energize the read MOS transistor 12 to read out signal electric charges from the photodiode (PD) 1 to the floating diffusion (FD) region 3. Next, the read MOS transistor 12 is de-energized. At that time, the signal level of each pixel 16 of the selected line is outputted to the vertical signal line 28. At the same time, a signal of a difference between the reset level and the signal level is sampled and held by the CDS circuit 25 provided at every column. Next, the horizontal scanning circuit 22 sequentially selects the horizontal selection transistors 26 to output the signal of each pixel of the selected line from the horizontal signal line 27 through an output circuit. This operation is repeated to output the signals of all pixels 16.

In this embodiment, the unit pixel 16 of this solid-state image pickup device is constructed as shown in FIG. 6 and FIGS. 7A to 7D.

Figure 6:
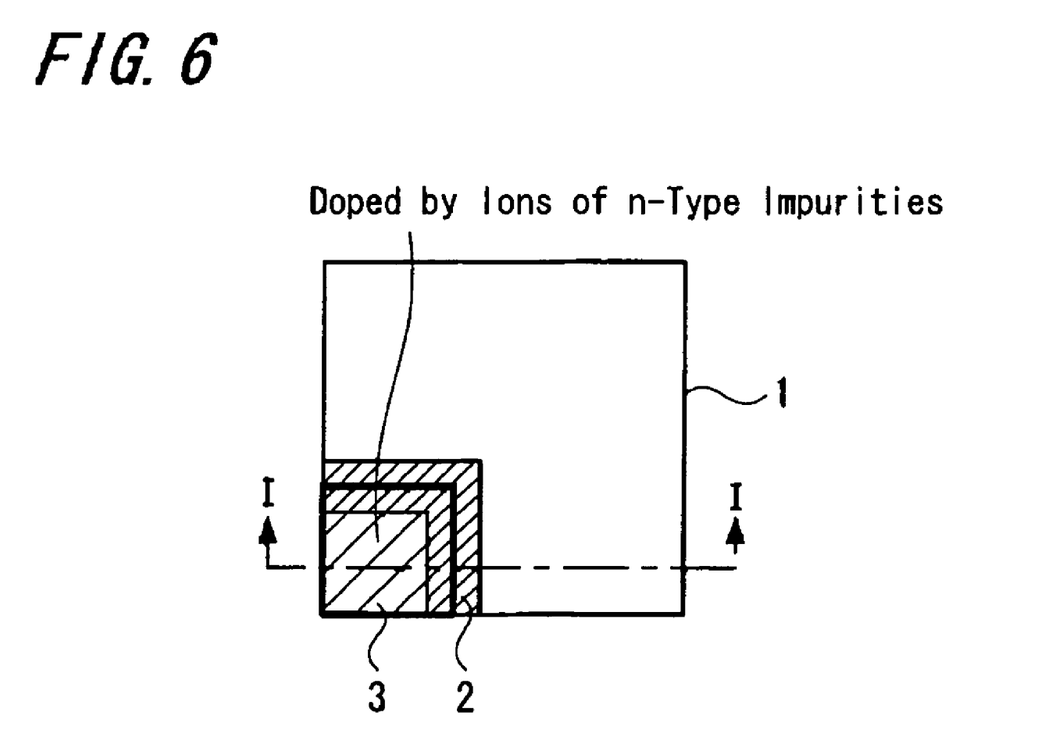
FIG. 6 is a plan view showing a main portion of the solid-state image pickup device according to the present invention.

FIG. 6 is a plan view showing an example of an arrangement of one pixel (unit pixel 16) of the solid-state image pickup device according to this embodiment. As shown in FIG. 6, incident light is photoelectrically converted into signal electric charges by a photodiode (PD) 1 comprising a photoelectrical-converting portion and the thus photoelectrically-converted signal electric charges are accumulated in this photodiode (PD) 1. The thus accumulated signal electric charges are converted into a voltage by a floating diffusion (FD) region 3 comprising an accumulation region. The signal electric charges accumulated in the photodiode (PD) 1 are transferred to the floating diffusion (FD) region 3 by a transfer gate 2.

Figure 7A:
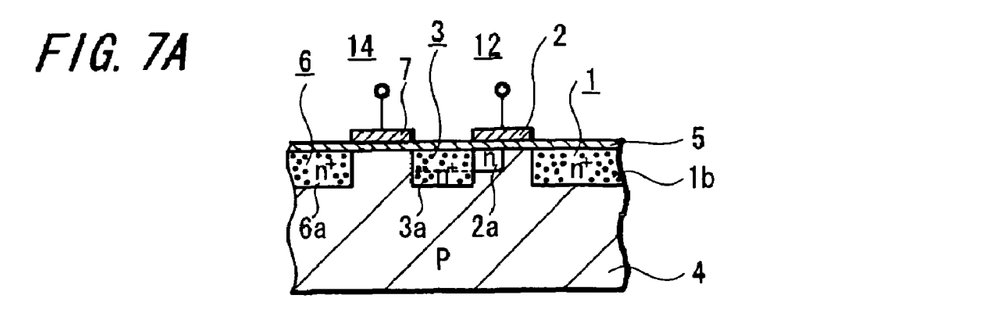
FIG. 7A is a cross-sectional view taken along the line VII-VII in FIG. 6 and shows a solid-state image pickup device according to the embodiment of the present invention.

FIG. 7A is a cross-sectional view taken along the line VII-VII in FIG. 6. In FIG. 7A, reference numeral 4 denotes a p-type semiconductor substrate. An $n^+$ type region $1b$ is formed on the p-type semiconductor substrate 4 by increasing the doze of implanted ions of n-type impurities. Thus, as shown in FIG. 7A, there is formed the photodiode (PD) 1 whose amount of saturation electric charges is increased to a predetermined amount of saturation electric charges so that image quality can be prevented from being lowered even when the number of the pixels of the solid-state image pickup device is increased and the solid-state image pickup device is miniaturized.

Further, an $n^+$ type region $3a$ is formed on the p-type semiconductor substrate 4 to thereby form the floating diffusion (FD) region 3. The transfer gate 2 is formed on the p-type semiconductor substrate 4 between the $n^+$ type region $1b$ of the photodiode (PD) 1 and the $n^+$ type region $3a$ of the floating diffusion (FD) region 3 through an insulating layer 5 made of an $SiO_2$ film.

In this case, the $n^+$ region $1b$, the transfer gate 2 and the $n^+$ region $3a$ constitute a read MOS transistor 12 which is used to read accumulated signal electric charges of the $n^+$ type region $1b$ of the photodiode (PD) 1 to the floating diffusion (FD) region 3.

Also, as shown in FIG. 7A, a reset drain 6 is composed of an $n^+$ type region $6a$ and it resets signal electric charges of the floating diffusion (FD) region 3. A reset gate 7 is formed on the p-type semiconductor substrate 4 between the $n^+$ type region $3a$ of the floating diffusion (FD) region 3 and the $n^+$ type region $6a$ of this reset drain 6 through the insulating layer 5.

In this case, the $n^+$ region $3a$ of the floating diffusion (FD) region 3, the reset gate 7 and the $n^+$ region $6a$ of the reset drain 6 constitute a reset MOS transistor 14 that resets signal electric charges of the floating diffusion (FD) region 3.

In this embodiment, the floating diffusion (FD) region 3 side of the transfer gate 2 of the substrate 4 and the floating diffusion (FD) region 3 are additionally doped by ions of n-type impurities, for example, ions of As (arsenic) shown hatched and thereby a predetermined width of the side of the floating diffusion (FD) region 3 under the transfer gate 2 is formed as an n-type region $2a$ as shown in FIG. 7A. In this case, it is sufficient that only the side of the floating diffusion (FD) region 3 under the transfer gate 2 may be doped with ions of n-type impurities.

Figure 7B:
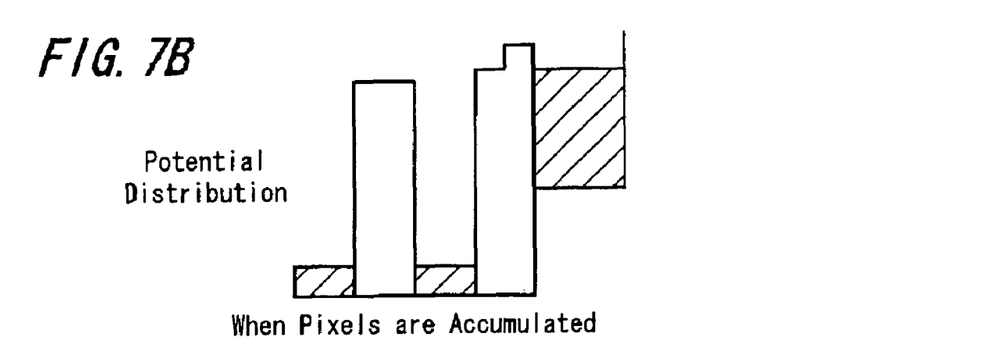
FIGS. 7B to 7D are respectively schematic diagrams showing potential distributions of the solid-state image pickup device shown in FIG. 7A.
Figure 7C:
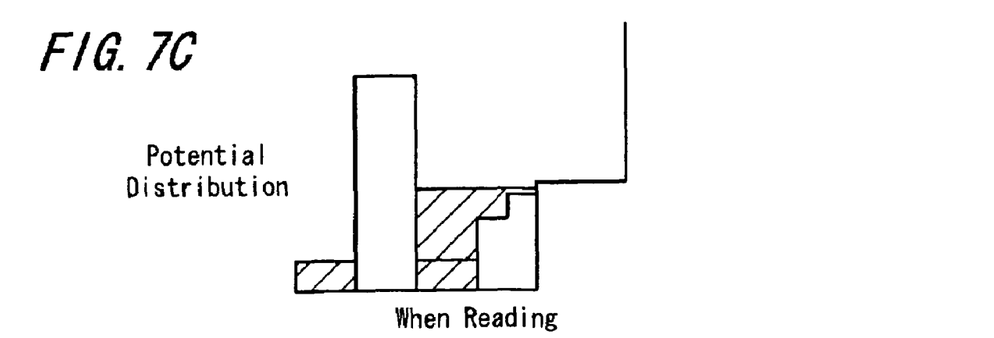
Figure 7D:
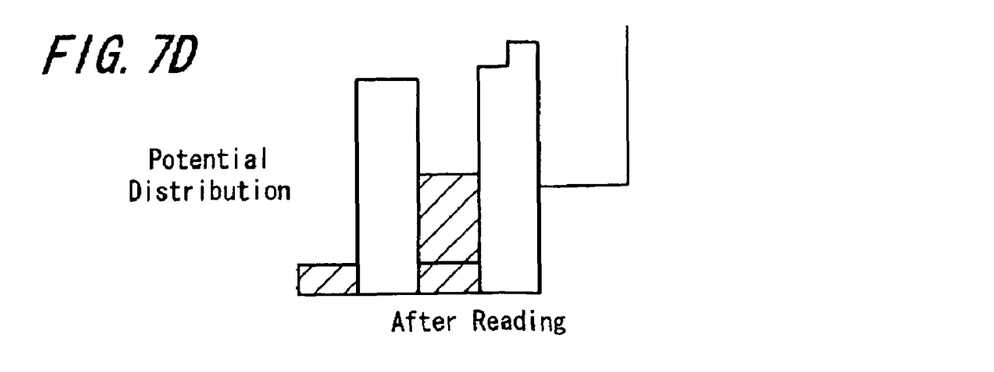

Further, in this case, the side of the floating diffusion (FD) region 3 under this transfer gate 2 is formed as the depletion region, whereby the potential of the predetermined width is increased as shown in FIGS. 7B, 7C and 7D. As a result, a difference in potential level is produced under the transfer gate 2, whereby the capacity of the floating diffusion (FD) region 3 is increased by the amount of this difference in potential level.

FIG. 7B shows a potential distribution obtained when the pixels shown in FIG. 7A are accumulated. FIG. 7C shows a potential distribution obtained when a read signal (read pulse $\phi$TRG from the horizontal scanning circuit 21) is supplied to the transfer gate (gate of the read MOS transistor 12) 2. According to this embodiment, as compared with FIG. 3C, since the capacity of the floating diffusion (FD) region 3 is increased by the amount of the difference in potential level under the transfer gate 2, all of the amount of the increased saturation electric charges of the photodiode (PD) 1 can be transferred to the floating diffusion (FD) region 3. FIG. 7D shows a potential distribution obtained after the read signal was read out from the transfer gate, that is, the read signal (read pulse $\phi$TRG) was removed from the transfer gate (gate of the read MOS transistor 12). As a result, signal electric charges can be prevented from remaining in the photodiode (PD) 1, thereby preventing a residual image from being generated.

Therefore, according to the present invention, even when the number of pixels of the solid-state image pickup device is increased and the solid-state image pickup device is miniaturized so that the size of the unit cell is reduced, it is possible to prevent image quality from being lowered.

Figure 8:
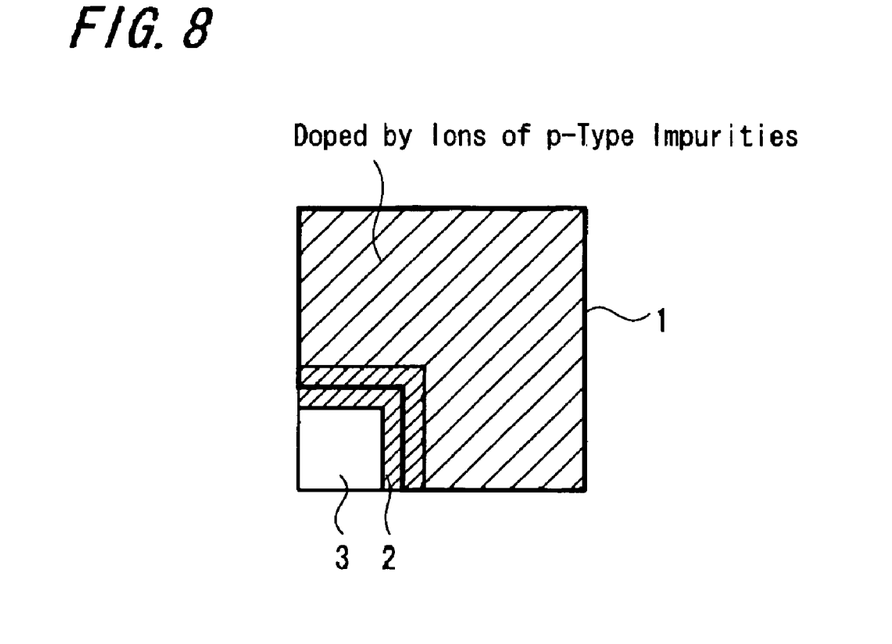
FIG. 8 is a plan view showing a main portion of the solid-state image pickup device according to other embodiment of the present invention.

FIG. 8 is a plan view showing an example of one pixel (unit pixel 16) of the solid-state image pickup device according to other embodiment of the present invention. In FIG. 8, parts identical to those in FIG. 6 are denoted by identical reference numerals.

According to the embodiment shown in FIG. 8, unlike the embodiment shown in FIG. 6, a predetermined width of the side of the photodiode (PD) 1 under the transfer gate 2 is formed as a p-type region by additionally doping the side of the photodiode (PD) 1 of the transfer gate 2 of the substrate 4 and the photodiode (PD) 1 with ions of p-type impurities, for example, ions of B (boron) shown hatched. In this case, it is sufficient that only the side of the photodiode (PD) 1 under the transfer gate 2 may be doped with ions of p-type impurities.

In the embodiment shown in FIG. 8, the side of the photodiode (PD) 1 under the transfer gate 2 is formed as an enhanced region and the side of the floating diffusion (FD) 3 under the transfer gate 2 is formed as the depletion region, whereby the difference in potential level is generated under this transfer gate 2. As a result, the capacity of the floating diffusion (FD) region 3 can be increased by the amount corresponding to this difference in potential level.

Accordingly, it can easily be understood that action and effects similar to those of the preceding embodiments can be achieved by the solid-state image pickup device using the unit pixel shown in FIG. 8.

While the embodiments in which the p-type semiconductor substrate 4 is used as the semiconductor substrate have been described so far, the present invention is not limited thereto and an n-type semiconductor substrate can of course be used as the semiconductor substrate. In this case, the n-type polarity is changed to a p-type polarity in the above-mentioned embodiments. Also in this case, it is needless to say that action and effects similar to those of the above-mentioned embodiments can be achieved.

Figure 9:
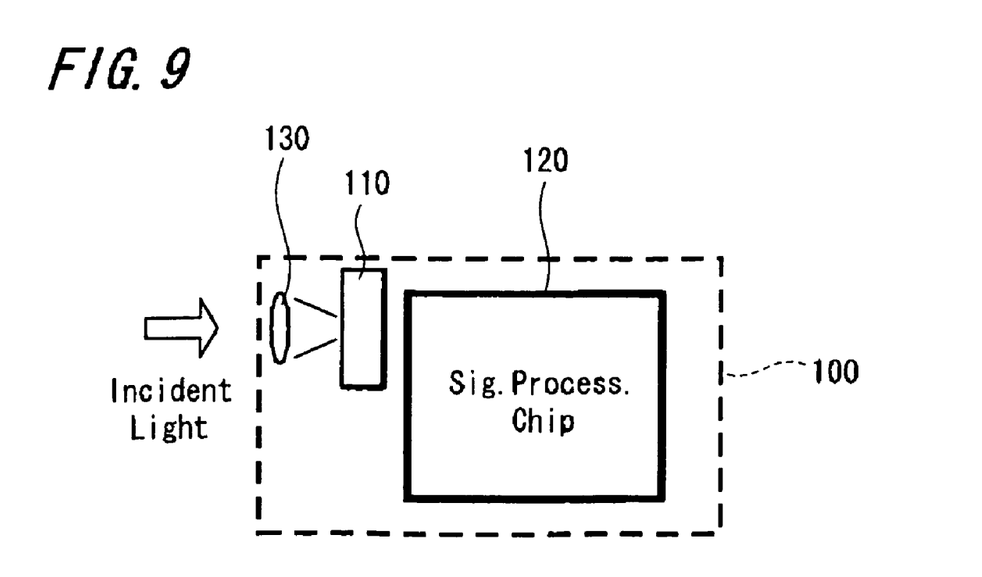
FIG. 9 is a schematic plan view showing a further embodiment in which the present invention is applied to a module type solid-state image pickup device.

Furthermore, the solid-state image pickup device according to the present invention may be formed as either a solid-state image pickup device formed as a single chip or a module type solid-state image pickup device formed as a set of a plurality of chips. FIG. 9 is a schematic plan view showing a further embodiment in which the present invention is applied to a module type solid-state image pickup device formed as a set of a plurality of chips. As shown in FIG. 9, a module type solid-state image pickup device (or camera) 100 may be composed of a sensor chip 110 for taking a picture and a signal processing chip 120 for processing a digital signal. Further, this module type solid-state image pickup device 100 may include an optical system 130. Even when the solid-state image pickup device is of the module type solid-state image pickup device, the module type solid-state image pickup device can generate a high-quality output signal with a wide dynamic range and which can improve performance of an electronic device on which the module type solid-state image pickup device is mounted.

According to the present invention, there is provided a solid-state image pickup device which is comprised of a plurality of pixels, each of the pixel composed of a photoelectric-converting portion for photoelectrically converting incident light into signal electric charges and accumulating the thus photoelectrically-converted signal electric charges, an accumulation region for converting the accumulated signal electric charges into a voltage and a transfer gate for transferring the signal electric charges accumulated in the photoelectric-converting portion to the accumulation region, wherein an amount of saturation electric charges is increased by a difference in potential level formed under the transfer gate.

In the solid-state image pickup device according to the present invention, the photoelectric-converting portion and the accumulation region are formed of first conductivity type semiconductor regions and a part of the accumulation region side under the transfer gate is doped by ions of first conductivity type impurities.

In the solid-state image pickup device according to the present invention, the photoelectric-converting portion and the accumulation region are formed of first conductivity type semiconductor regions and a part of the photoelectric-converting portion side under the transfer gate is doped by ions of second conductivity type impurities.

Further, according to the present invention, there is provided a module type solid-state image pickup device which is comprised of an image pickup region composed of an array of a plurality of pixels, each pixel including a photoelectric-converting portion, a read gate portion for reading out electric charges generated by the photoelectric-converting portion and an accumulation portion for accumulating therein electric charges read out through the read gate portion and an optical system for introducing incident light into the image pickup region, wherein the read gate portion includes a first impurity region located on the side of the accumulation portion and a second impurity region having an electric potential lower than that of the first impurity region and which is adjacent to the first impurity region.

In the module type solid-state image pickup device according to the present invention, the first and second impurity regions are formed under one gate electrode.

Furthermore, according to the present invention, since the difference in potential level is formed under the transfer gate, the capacity of the accumulation region can be increased so that the amount of saturation electric charges of the photodiode (photoelectric-converting portion) can be increased without causing a residual image.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A solid-state image pickup device comprising:
a plurality of pixels, each of said pixels comprised of:
a substrate well region of a second conductivity type formed in a substrate;
a photoelectric-converting portion formed in the substrate well region for photoelectrically converting incident light into signal charges and accumulating said signal charges;
an accumulation region for converting said accumulated signal electric charges into a voltage formed by implanting ions of a first conductivity type into the substrate well region, said first conductivity type being opposite said second conductivity type; and
a transfer gate for transferring said signal charges accumulated in said photoelectric-converting portion to said accumulation region, said transfer gate defining a channel region existing in the substrate below the transfer gate between said photoelectric converting portion and said accumulation region,
wherein two transfer gate well regions are formed in the channel region under said transfer gate including a first transfer gate well region formed by implanting ions of the first conductivity type in only a portion of the channel region located laterally adjacent the accumulation region, and a second transfer gate well region formed by implanting ions of the second conductivity type in only a portion of the channel region located laterally adjacent the photo-electric converting portion such that the concentration of ions of the second conductivity type in the second transfer gate well region is higher than the concentration of ions of the second conductivity type in the substrate well region, said second transfer gate well region extending from an end of the channel region closest to the photoelectric-converting portion and at least partially across the channel region towards the first transfer gate well region.

2. The solid-state image pickup device according to claim 1, wherein said photoelectric-converting portion is formed of a first conductivity type semiconductor region.

3. The solid-state image pickup device according to claim 1, wherein an amount of saturation signal charges is increased by a difference in potential level formed under said transfer gate.

4. The solid-state image pickup device according to claim 1, wherein said substrate is formed of a p-type material.

5. The solid-state image pickup device according to claim 1, further comprising a reset transistor formed adjacent the accumulation region and including a reset transistor gate, said reset transistor gate defining a reset channel region existing in the substrate below the reset transistor gate between a reset drain region and said accumulation region.

6. The solid-state image pickup device according to claim 1, wherein said accumulation region is electrically connected to a gate of an amplifying MOS transistor.

7. A module type solid-state image pickup device comprising:
an image pickup region comprised of an array of a plurality of pixels, each pixel including a photoelectric-converting portion, a read gate portion for reading out charges generated by said photoelectric-converting portion, and an accumulation portion for accumulating therein charges read out through said read gate portion, all formed in a substrate well region of a first conductivity type; and an optical system for introducing incident light into said image pickup region, wherein said read gate portion includes a first impurity region located on the side of said accumulation portion formed of a second conductivity type opposite the first conductivity type, and a second impurity region formed adjacent to said first impurity region and formed of a first conductivity type having a concentration greater than the concentration of the substrate well region, said second impurity region extending from an end of the read gate portion closest to the photoelectric-converting portion and at least partially across the read gate portion towards the photoelectric-converting portion.

8. The module type solid-state image pickup device according to claim 7, wherein said first and second impurity regions are formed under one gate electrode.

9. The module type solid-state image pickup device according to claim 7, wherein an amount of saturation signal charges is increased by a difference in potential level formed under said read gate.

10. The module type solid-state image pickup device according to claim 7, wherein said second impurity region has an electric potential lower than that of said first impurity region.

11. The module type solid-state image pickup device according to claim 7, wherein said substrate is formed of a p-type material.

12. The module type solid-state image pickup device according to claim 7, further comprising a reset transistor formed adjacent the accumulation region and including a reset transistor gate, said reset transistor gate defining a reset channel region existing in the substrate below the reset transistor gate between a reset drain region and said accumulation region.

13. The module type solid-state image pickup device according to claim 7, wherein said accumulation region is electrically connected to a gate of an amplifying MOS transistor.

14. A solid-state image pickup device comprising:
a plurality of pixels, each of said pixels comprised of:
a substrate well region of a second conductivity type formed in a substrate;
a photoelectric-converting portion formed in the substrate well region for photoelectrically converting incident light into signal charges and accumulating said signal charges;
an accumulation region for converting said accumulated signal electric charges into a voltage formed by implanting ions of a first conductivity type into the substrate well region, said first conductivity type being opposite said second conductivity type; and
a transfer gate for transferring said signal charges accumulated in said photoelectric-converting portion to said accumulation region, said transfer gate defining a channel region existing in the substrate below the transfer gate between said photoelectric converting portion and said accumulation region,
wherein two laterally-extending surface-level transfer gate well regions are formed in the channel region under said transfer gate and in the upper surface of the substrate well region, including a first transfer gate well region formed by implanting ions of the first conductivity type in only a portion of the channel region located laterally adjacent the accumulation region, and a second transfer gate well region formed by implanting ions of the second conductivity type in only a portion of the channel region located laterally adjacent the photo-electric converting portion such that the concentration of ions of the second conductivity type in the second transfer gate well region is higher than the concentration of ions of the second conductivity type in the substrate well region.

* * * * *